Feb. 10, 1970      H. N. TAYLOR      3,494,614
SNOWFALL SIMULATING DISPLAY LIGHTING ASSEMBLY
Filed Sept. 27, 1967      2 Sheets-Sheet 1
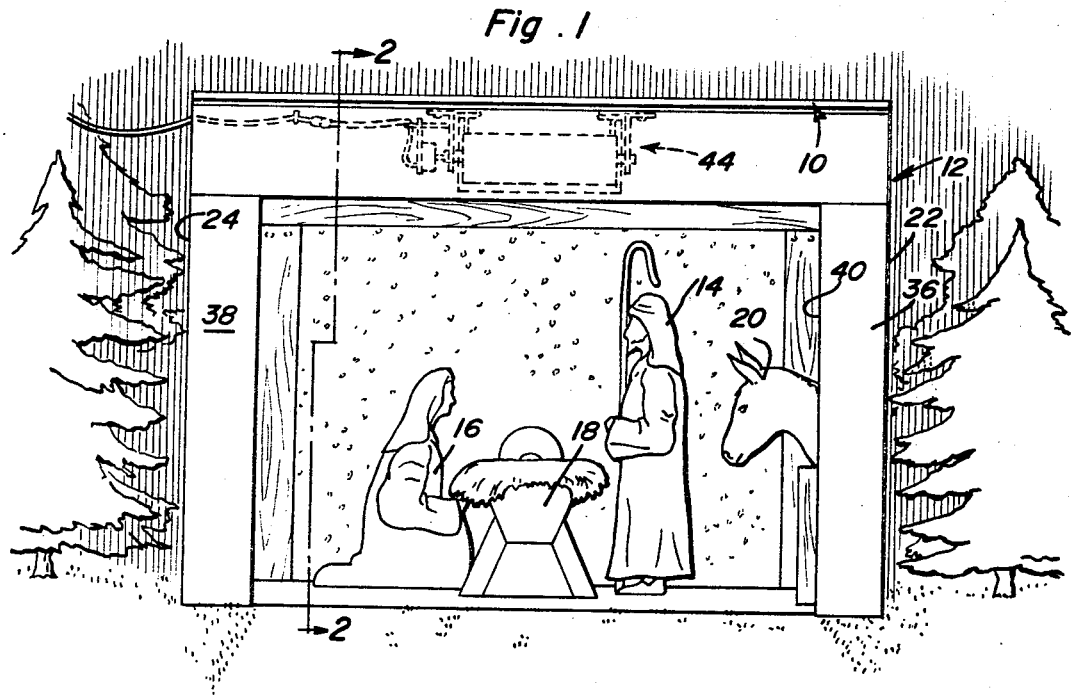
Fig. 1
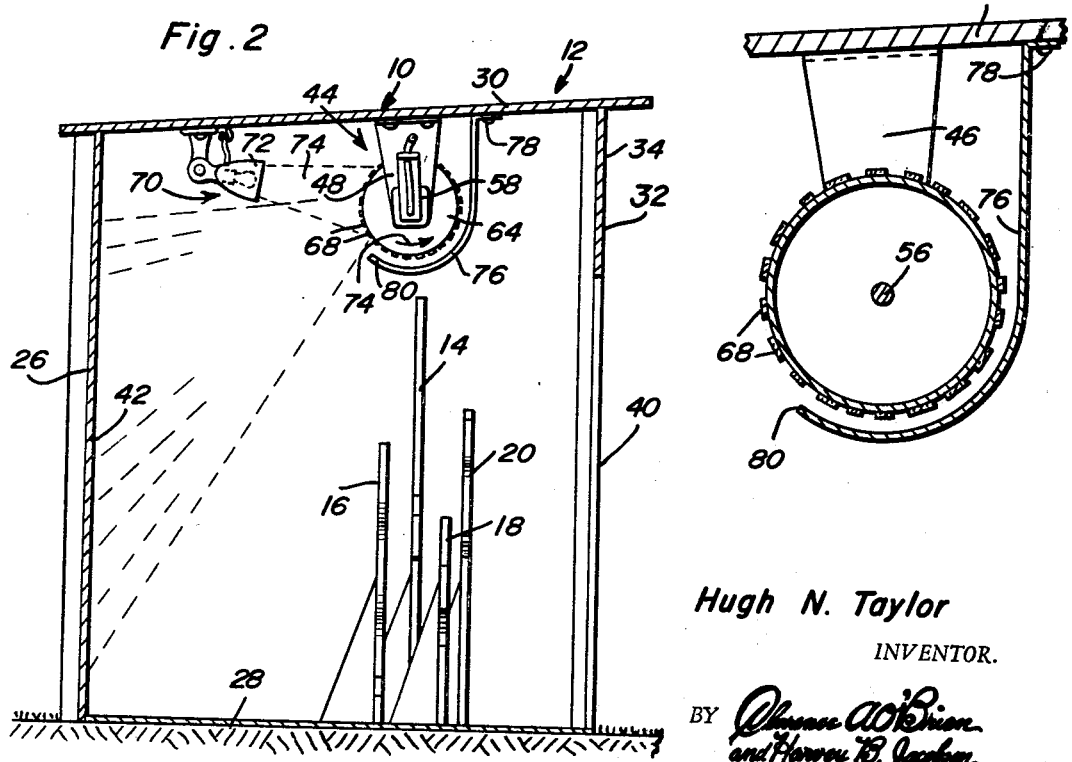
Fig. 2
Fig. 4
Hugh N. Taylor
INVENTOR.

Feb. 10, 1970     H. N. TAYLOR     3,494,614
SNOWFALL SIMULATING DISPLAY LIGHTING ASSEMBLY
Filed Sept. 27, 1967     2 Sheets-Sheet 2
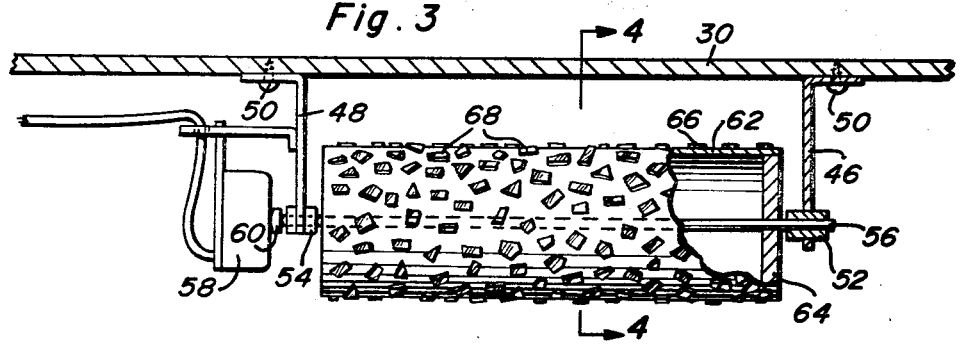
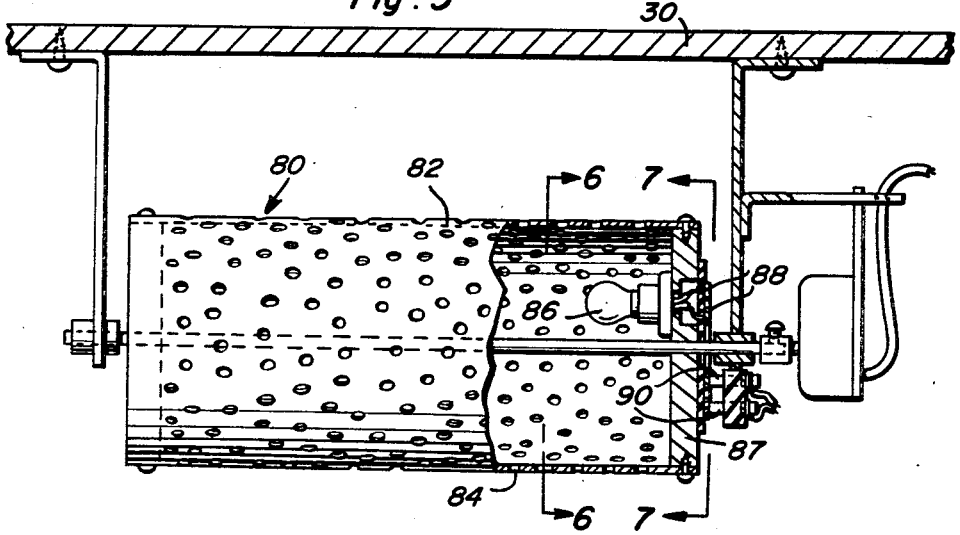
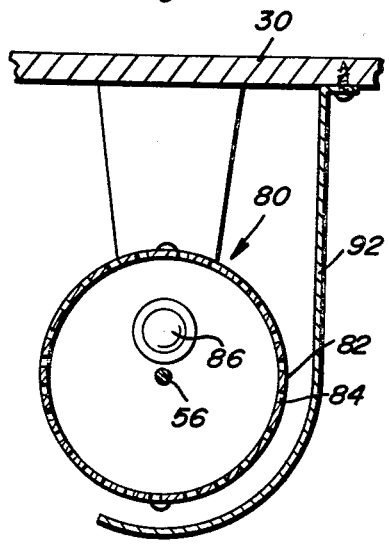
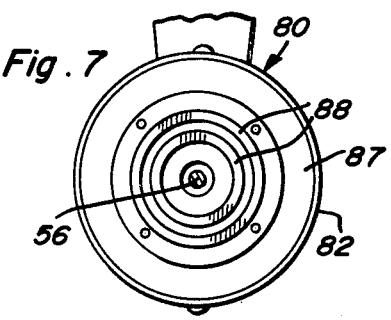
Hugh N. Taylor
INVENTOR.

United States Patent Office 3,494,614
Patented Feb. 10, 1970

1

3,494,614
SNOWFALL SIMULATING DISPLAY
LIGHTING ASSEMBLY
Hugh N. Taylor, 5977 Cyrus Ave.,
Baton Rouge, La. 70805
Filed Sept. 27, 1967, Ser. No. 671,007
Int. Cl. A63j 5/02, 3/00
U.S. Cl. 272—8                                    5 Claims

ABSTRACT OF THE DISCLOSURE

A generally cylindrical member journalled for rotation about a horizontal axis and including circumferentially and longitudinally spaced portions thereof coacting with illumination means to cause rays of light to be cast generally radially outwardly from the circumferentially and longitudinally spaced portions of the cylindrical member toward and incident upon a backdrop of a display whereby as the cylindrical member is rotated areas of the backdrop illuminated by the rays of light incident thereon will be caused to move vertically along the backdrop.

---

The snowfall simulating lighting assembly of the instant invention has been specifically designed for use as supplemental lighting for displays simulating an outdoor scene and for the purpose of simulating snowfall in that scene.

The lighting assembly includes a cylindrical member journalled for rotation about a horizontal axis and including portions thereon spaced circumferentially thereabout and longitudinally therealong which coact with illumination means comprising a part of the lighting assembly to cause rays of light to be cast generally radially outwardly of the circumferentially and longitudinally spaced portions of the cylindrical member. The cylindrical member is disposed forwardly of and in general horizontal alignment with the upper marginal edge portion of the backdrop of the associated display or scene whereby the individual beams of light being cast generally radially outwardly of the cylindrical member will fall upon and move vertically along the backdrop. Of course, the cylindrical member is rotated in a direction so that the upper peripheral portion thereof advances toward the backdrop and therefore the beams of light cast upon the backdrop move downwardly along the backdrop to simulate snowfall.

If it is desired, any desirable form of light shield may be operatively associated with the cylindrical member whereby the beams of light cast radially outwardly of the cylindrical member will fall only upon the backdrop of the display or scene and not upon adjacent wall portions or floor portions of the scene or display.

The main object of this invention is to provide a snowfall simulating lighting assembly for a display simulating an outdoor scene.

Another object of this invention is to provide a lighting assembly in accordance with the immediately preceding object and which may be adapted for use in conjunction with many different displays.

A final object of this invention to be specifically enumerated herein is to provide a lighting assembly in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

2

FIGURE 1 is a front elevational view of a display with which the lighting assembly of the instant invention is operatively associated, the lighting assembly being illustrated in phantom lines;

FIGURE 2 is a vertical sectional view taken substantially upon the plane indicated by section line 2—2 of FIG. 1 and on somewhat of an enlarged scale;

FIGURE 3 is an enlarged fragmentary front elevational view of the lighting assembly with parts thereof being broken away and illustrated in vertical section and with the light shield removed;

FIGURE 4 is an enlarged fragmentary vertical sectional view taken substantially upon the plane indicated by section line 4—4 of FIGURE 3;

FIGURE 5 is an elevational view of a modified form of lighting assembly with parts thereof being broken away and illustrated in vertical section and the associated light shield removed;

FIGURE 6 is a fragmentary enlarged vertical sectional view taken substantially upon the plane indicated by section line 6—6 of FIGURE 5 and with the light shield in operative association with the cylindrical member of the modified form of lighting assembly; and FIGURE 7 is a vertical sectional view taken substantially upon the plane indicated by section line 7—7 of FIGURE 5 and with the light shield removed.

Referring now more specifically to the drawing the numeral 10 generally designates an outdoor display including a shed structure generally referred to by the reference numeral 12 in which a plurality of figurines 14, 16, 18 and 20 are disposed. The shed 12 includes opposite side walls 22 and 24, a rear wall 26, a bottom wall 28 and a roof or top wall 30. In addition, the shed includes a partial front wall 32 including an upper portion 34 and opposite side portions 36 and 38 defining a large viewing opening 40.

The inner surface 42 of the rear wall 26 defines a backdrop for the scene represented by figurines 14, 16, 18 and 20 and the upper portion 34 of the front wall 32 defines a shield so that the upper portion of the interior of the shed may not be viewed by persons disposed forwardly of the shed 12.

A first form of lighting assembly is generally referred to by the reference numeral 44 and includes a pair of depending brackets 46 and 48 secured to the undersurface of the top wall 30 in any convenient manner such as by fasteners 50. The lower ends of the brackets 46 and 48 support journal bearings 52 and 54 through which opposite end portions of a support shaft 56 are journalled and an electric motor 58 is supported from the bracket 48 and includes an output shaft 60 which is drivingly coupled to the adjacent end of the shaft 56.

Mounted on the shaft 56 between the brackets 46 and 48 is a cylindrical member 62 including circular end walls 64 mounted on the shaft 56 for rotation therewith and a hollow cylindrical body portion 66 extending between the end walls 64. The body portion 66 has a plurality of irregularly shaped generally planar and light reflective members 68 secured to its outer surface at points spaced circumferentially about and longitudinally of the body portion 66. The light reflective members 68 are disposed in planes which are generally normal to radii of the axis of rotation of the cylindrical member 62 which pass through the light reflective members 68 and a suitable light source generally referred to by the reference numeral 70 is secured to and suspended from the top wall or roof 30 between the cylindrical member 62 and the backdrop 42. The light source 70 is shielded by a shield 72 so as to direct a narrow flat beam 74 on the cylindrical member 62. The light reflective members 68 reflect the light beam 74 back toward the backdrop 42 and thereby cause individual beams of light to be incident upon the backdrop 42. However, when the motor 58 is actuated, the cylindrical member 62 rotates in a counterclockwise direction as indicated by the arrow 74 in FIGURE 2 of the drawings and therefore the individual beams of light reflected rearwardly by the light reflective members 68 move downwardly along the backdrop 42 and thereby give the illusion of snow fall when the scene represented by the backdrop 42 and the figurines 14, 16, 18 and 20 are viewed in front of the shed 12.

Operatively associated with the lighting assembly 44 is a shield 76 supported from the roof 30 in any convenient manner such as by fasteners 78 and including a free edge portion 80 which is disposed so as to prevent light reflected from the light reflective members 68 from being cast upon the floor or bottom wall 28 of the shed 12. The free edge 80 of the shield 76 thereby prevents any light reflected directly from the reflective members 68 from being cast upon the floor 28. Of course, if it is desired, the shield 76 may also include side wall panels so as to insure that no light reflected directly from the reflective members 68 will be cast upon the inner surfaces of the side walls 22 and 24.

Referring now more specifically to FIGURES 5–7 of the drawings there may be seen a modified form of lighting assembly generally referred to by the reference numeral 80 and which is substantially identical to the lighting assembly 44 except that the cylindrical body portion 82 is provided with circumferentially and a longitudinally spaced generally radial apertures 84 in lieu of the reflective members 68 and illumination means 86 is disposed within the body portion 82. Further, the end wall 87 of the body portion 82 includes a pair of concentric and insulatively supported contact rings 88 with which a pair of stationarily supported brushes 90 are engaged whereby the illumination means 86 carried by the inner surface of the end wall 87 may be connected to a suitable source of electrical potential.

The lighting assembly 80 includes a shield 92 similar to the shield 76 and the illumination means 86 may be of any suitable type adapted to cast narrow beams of light generally radially outwardly of the body portion 82 through the apertures 84. Although a conventional incandescent light bulb has been illustrated as the illumination means 86, the latter may be in the form of a fluorescent lighting tube extending longitudinally of the body portion 82.

In any event, the operation of the lighting assemblies 44 and 80 is substantially identical in that narrow beams of light are directed generally radially outwardly of both body portions 66 and 82 and rotation of the body portions 66 and 82, in conjunction with the shields 76 and 92 results in the narrow beams of light cast outwardly from the body portion 66 and 82 to move downwardly along the backdrop 42 and to be confined in an area not extending beyond the opposite side and lower marginal edge portions of the backdrop 42.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a display including an upstanding backdrop having front and rear faces and adapted to be viewed from the front, a top wall projecting forwardly from the upper marginal portion of said backdrop and a partial front wall depending downwardly from the forward marginal portion of said top wall and including a lower marginal edge portion disposed below a horizontal plane spaced below the upper marginal portion of said backdrop, a snow fall simulating lighting assembly comprising a generally horizontal cylindrical member disposed below said top wall and above said plane and journaled for rotation about an axis extending longitudinally therethrough and generally paralleling said backdrop, means for rotating said cylindrical member, illumination means disposed below said top wall and above said plane, portions of said cylindrical member spaced circumferentially thereabout and longitudinally therealong and said illumination means coacting to form rays of light cast generally radially outwardly from said portions of said cylindrical member toward and incident upon said backdrop whereby when said cylindrical member is rotated areas of said backdrop illuminated by said rays of light will be caused to move vertically downwardly along said backdrop, said display including a floor projecting forwardly from the lower marginal edge portion of said backdrop, a plurality of upstanding figures disposed on and projecting upwardly from said floor and spaced forwardly of said backdrop, said cylindrical member and illuminating means being operative to cast rays of light from said cylindrical member rearwardly and downwardly behind said figures and upon said backdrop from an area of said backdrop above said plane downwardly to the lower marginal edge portion of said backdrop.

2. The combination of claim 1 wherein said portions of said cylindrical member comprise light reflective outer surface portions thereof facing generally radially outwardly of said cylindrical member, said illumination means being disposed so as to cast light upon the side of said cylindrical member facing said backdrop.

3. The combination of claim 2 wherein said cylindrical member is disposed in front of said backdrop in a location at least substantially hidden from view by persons viewing said display from a vantage point forward of said cylindrical member.

4. The combination of claim 1 wherein said cylindrical member is hollow and constructed of at least substantially opaque material and said portions of said cylindrical member comprise light transmitting portions of said cylindrical member, said illumination means being disposed within said cylindrical member.

5. The combination of claim 2 including shield means also disposed above said plane and at least substantially hidden from view operable to shield portions of said display disposed forward of the lower end of said backdrop from said rays of light.

References Cited

UNITED STATES PATENTS

| | | | |
|---|---|---|---|
| 1,719,622 | 7/1929 | Price | 40—106.53 |
| 2,170,368 | 8/1939 | Gentilini | 40—106.53 |
| 2,356,191 | 8/1944 | Weiss | 272—15 |
| 2,708,114 | 5/1955 | Hancock | 40—106.53 |
| 2,811,798 | 11/1957 | Brooks | 40—106.53 |
| 2,963,807 | 12/1960 | Relph et al. | 40—106.53 |

ANTON O. OECHSLE, Primary Examiner

U.S. Cl. X.R.

40—106.52; 272—15